United States Patent [19]

Hanai

[11] Patent Number: 5,461,662
[45] Date of Patent: Oct. 24, 1995

[54] ELECTRONIC EXCHANGE APPARATUS

[75] Inventor: Katsuyuki Hanai, Tokyo, Japan

[73] Assignee: Kabushiki Kaisha Toshiba, Kawasaki, Japan

[21] Appl. No.: 104,594

[22] Filed: Aug. 10, 1993

[30] Foreign Application Priority Data

Aug. 11, 1992 [JP] Japan ...................... 4-214020

[51] Int. Cl.⁶ .............. H04M 1/29; H04M 3/08; H04M 3/22
[52] U.S. Cl. .................. 379/9; 375/10; 375/15
[58] Field of Search ................ 375/1, 9, 10, 11, 375/12, 13, 14, 15, 16, 17, 18, 32, 33

[56] References Cited

U.S. PATENT DOCUMENTS

| | | | |
|---|---|---|---|
| 4,639,557 | 1/1987 | Butler et al. | 379/18 X |
| 4,782,506 | 11/1988 | Sevcik | 379/14 X |
| 5,276,727 | 1/1994 | Kim et al. | 379/14 X |

Primary Examiner—Stephen Chin
Assistant Examiner—Paul Loomis
Attorney, Agent, or Firm—Finnegan, Henderson, Farabow, Garrett & Dunner

[57] ABSTRACT

An electronic exchange apparatus which is maintained by remote control based on information supplied from a maintenance terminal through a communications network, comprises a memory for storing called party number information representing a number for maintaining the electronic exchange apparatus and calling party number information representing a number of the maintenance terminal for allowing a maintenance operation, and a controller for, when a call is received from the communications network, detecting whether called party number information and calling party number information included in a message transmitted together with the call, coincide with the called party number information and the calling party number information stored in the memory, respectively, and for, when the information included in the message coincides with the information stored in the memory, recognizing the call as a maintenance call for maintaining the electronic exchange apparatus, thereby setting the electronic exchange apparatus in a maintenance mode.

7 Claims, 4 Drawing Sheets

CALL CONTROL PROCEDURE
ISDN LAYER-3 MESSAGE

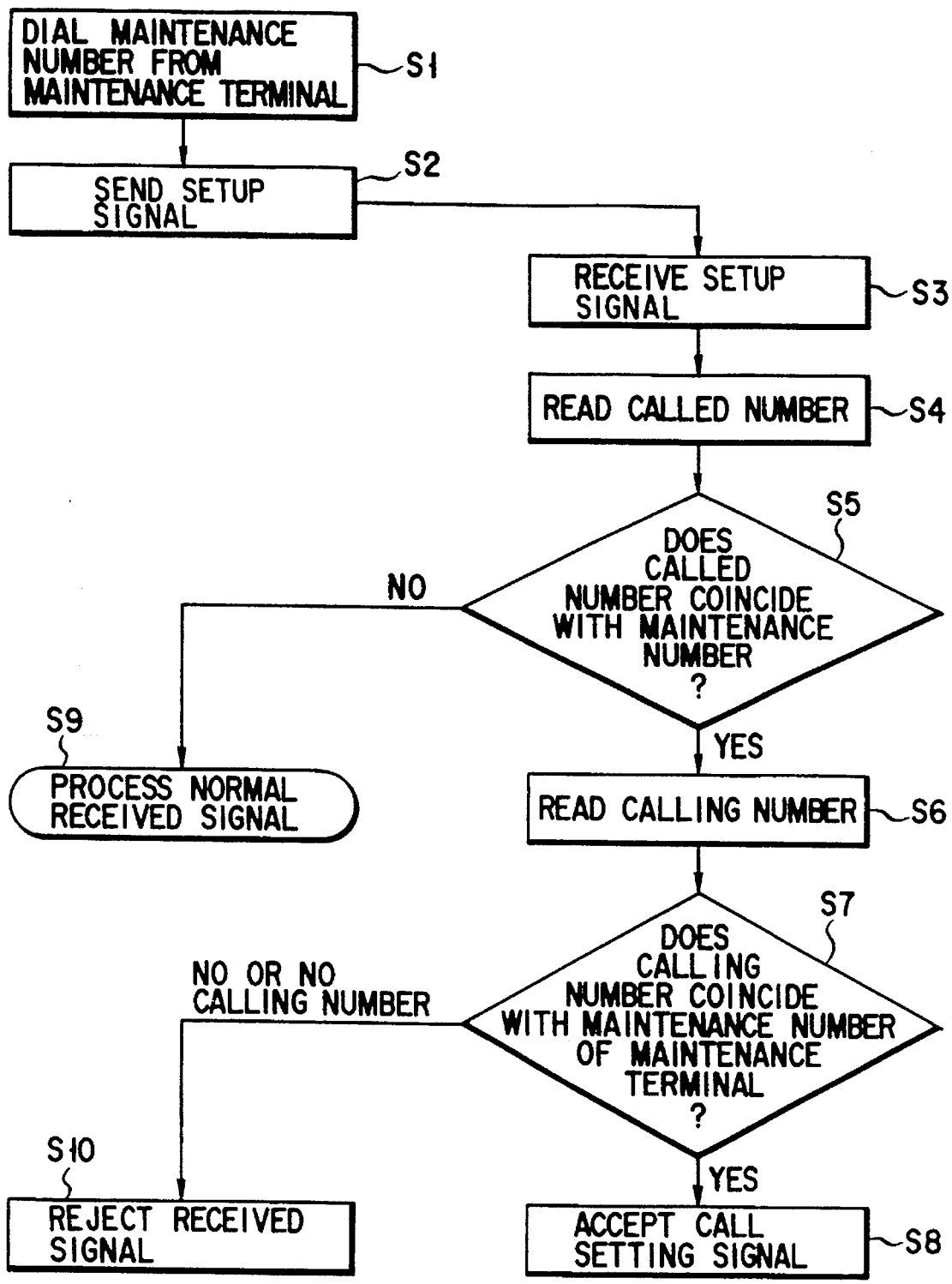
F I G. 3

[EXECUTION OF MAINTENANCE COMMAND]

ELECTRONIC EXCHANGE APPARATUS

BACKGROUND OF THE INVENTION

1. Field of the Invention

The present invention relates to an electronic exchange system which can be maintained by remote control.

2. Description of the Related Art

Recently a private electronic exchange apparatus has employed its microprocessor as a center of control and has been more intelligent and more functional. A private electronic exchange apparatus using a microprocessor comprises extension lines and office lines and has service functions as well as basic functions of exchange connections between the extension lines and between the extension lines and office lines. One of the service functions is a remote-maintenance function.

Though the private electronic exchange apparatus has various service functions such as an increase in extension lines, management of charges for each extension line, and regulation of usable extension and office lines, it requires a data table or the like in order to fulfill these functions. Since the data table has to be altered, deleted, and added in accordance with a variation in circumstances, the private electronic exchange apparatus has the remote-maintenance function.

A private electronic exchange apparatus generally includes an interface to which an operational terminal for transmitting/receiving commands and data can be connected. If a maintenance terminal (a maintenance console) is connected to the interface to send commands and data, a data table in a storage unit of the private electronic exchange apparatus can be changed, added, deleted, etc. The maintenance of the apparatus can thus be performed by the maintenance terminal attached thereto. Otherwise, the maintenance of plural private electronic exchange apparatuses located in different positions can be controlled by remote control from a maintenance control center.

In order to maintain a remote private electronic exchange apparatus, the apparatus is connected to the maintenance terminal of the maintenance control center by means of their private lines, the apparatus is called from the maintenance terminal through its private line, and a command and data are transmitted to the apparatus by operating a keyboard of the maintenance terminal, with the result that data is rewritten, added, deleted, etc.

This remote-control maintenance is very convenient since no maintenance man has to be stationed in a remote private electronic exchange apparatus and necessary measures can be taken by remote control from the maintenance control center whenever the maintenance of the apparatus is required. However, the remote-control maintenance necessitates private lines for connecting the private electronic exchange apparatus and the maintenance terminal. The private lines are used in order to connect the maintenance terminal with the exchange apparatus through an interface. The use of the private lines increases the cost of an electronic exchange system, and it is not efficient to use the lines only for the infrequent maintenance of the exchange apparatus.

SUMMARY OF THE INVENTION

An object of the present invention is to provide a private electronic exchange apparatus the maintenance of which can be controlled by remote control without any private lines.

To attain the above object, there is provided an electronic exchange apparatus which is maintained by remote control based on information supplied from a maintenance terminal through a communications network, comprising:

a memory for storing called party number information representing a number for maintaining the electronic exchange apparatus and calling party number information representing a number of the maintenance terminal for allowing a maintenance operation; and a controller for, when a call is received from the communications network, detecting whether called party number information and calling party number information included in a message transmitted together with the call, coincide with the called party number information and the calling party number information stored in the memory, respectively, and for, when the information included in the message coincides with the information stored in the memory, recognizing the call as a maintenance call for maintaining the electronic exchange apparatus, thereby setting the electronic exchange apparatus in a maintenance mode.

In the electronic exchange apparatus, the message includes maintenance operation information, and the controller comprises means for maintaining the electronic exchange apparatus based on the maintenance operation information included in the message.

In the electronic exchange apparatus having the above constitution, the memory means stores the called party number information representing a number for maintaining the apparatus itself and the calling party number information representing a number for allowing a maintenance operation. When the apparatus needs to be maintained, a called party number for maintaining the apparatus, to which an information element for a desired maintenance operation is added, is called from an external communication terminal (maintenance terminal). If a digital network is used in this case, the called party number, the information element, and a calling party number (a telephone number of a subscriber's loop connected to the communication terminal) are added to a call setting message of communication protocol, and this message is transmitted to a destination. In the exchange apparatus, the control means compares the called party number and the calling party number added to the call setting message with the information stored in the memory means in order to detect whether the called and calling party numbers are set for allowing the maintenance operation. If these numbers are set therefor, the exchange apparatus moves to a maintenance mode, and a user's desired information element is acquired from the transmitted message. This information element serves as information of the maintenance operation.

With the above operation, the exchange apparatus can be maintained based on the information transmitted from the communication (maintenance) terminal connected to an office line of the apparatus. After the apparatus moves to the maintenance mode, the control means is able to directly perform various maintenance operations other than the maintenance operation instructed by the message transmitted from the communication (maintenance).

As described above, in the present invention, the exchange apparatus stores in advance a called party number used for its maintenance and a calling party number given to the maintenance terminal and, when a called party number and a calling party number of a received-signal call coincide with those stored in advance, respectively, determines the received-signal call as a maintenance call and employs maintenance information or inn-channel information transmitted by the call for the maintenance of the apparatus.

Consequently, according to the present invention, the maintenance of the exchange apparatus can be performed by remote control without using any private line, and it can also be performed using calling-number and called-number information transmitted only from the maintenance terminal connected to a specific office line of the apparatus. The lines of the apparatus can thus be used with high efficiency.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a flowchart showing an operation of the electronic exchange apparatus shown in FIG. 2;

DETAILED DESCRIPTION OF THE PREFERRED EMBODIMENTS

Embodiments of the present invention will now be described, with reference to the accompanying drawings.

The present invention is directed to a system using an ISDN (Integrated Services Digital Network). However, it is not limited to the ISDN but can be applied to a communication system capable of transfer of desired data, such as a communications network system using analog signals.

First the ISDN will be described as follows.

The ISDN is one of various communications network systems which have been developed in accordance with the progress of communication technology and the variety of communication modes and a communication system for integrating various services of telephone communications, data communications, and facsimile communications by a single digital communications network, and providing the integrated services. For example, this communication system has the following structure.

The communication system comprises an ISDN exchange apparatus to which a digital line exchange network, a packet exchange network, a common line signal network, and the like are connected. In this system, a subscriber's line is connected to a network end-terminal device on the user's side, and the network end-terminal device is connected to a user's bus. A communication terminal device such as a telephone set, a facsimile apparatus, and a personal computer can be connected to the user's bus. A plurality of communication channels are selectively used for each subscriber's line to communicate with the communication terminal device. For example, in a basic interface whose transmission rate is 192K bits/second, two B-channels of 64K bits/second and one D-channel of 16K bits/second are time-division-multiplexed, and data is transmitted using these channels.

When the basic interface is used, a maximum of eight ISDN terminals can be connected to the user's bus, and a sub-address can be set to each of the ISDN terminals. If a sub-address is included in a call setting message of a received signal, the signal is transmitted to an ISDN terminal corresponding to the sub-address. If no sub-address is included therein, it is transmitted to the respective ISDN terminals.

Figure 1A:
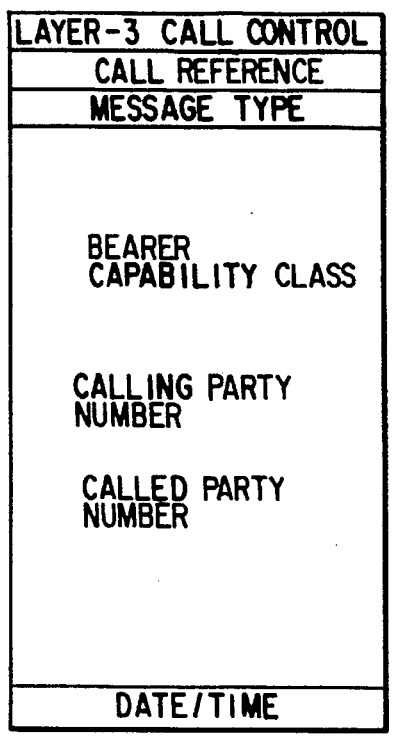
FIGS. 1A and 1B are views each showing an example of a call setting message.
Figure 1B:
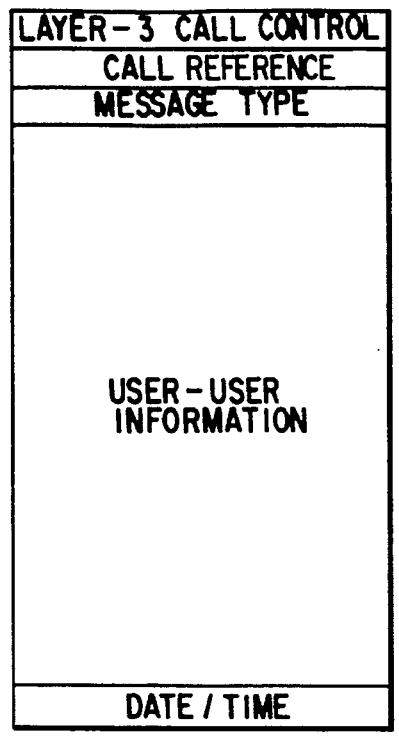

In the ISDN, a call control procedure is executed for calling connection and, in this case, various items of message data are exchanged and then a channel is secured. As shown in FIG. 1A, a layer-3 message, which serves as a call setting message, includes information elements such as layer-3 calling control, a call reference, a message type, bearer capability class, a calling party number, a called party number, and date/time, which are to be exchanged for the calling connection. As shown in FIG. 1B, the call setting message also includes an area of user-user information, which can be used freely by a user bear capability class, calling party number, and called party number.

The above-described ISDN is used in Japan. According to one example of an ISDN used in the United States, a call setting message includes an area of user-user information as well as the information elements shown in FIG. 1A, so that transmission service of the user-user information can be performed when calling is set.

In the ISDN, when a call is set, various types of messages can be transmitted by the call, and the transmission service of user-user information can be performed by a message other than the call setting message.

The private electronic exchange apparatus of the present invention comprises a maintenance circuit which is able to perform a maintenance operation in accordance with a command and an ISDN control circuit which, when a signal received by a specific telephone number is transmitted from a caller of the telephone number, recognizes the signal as a maintenance call, sets the apparatus in a maintenance mode, and supplies data of the received signal to the maintenance circuit. The maintenance circuit is connected to an ISDN loop in response to the signal transmitted from the caller to the specific telephone number, using information which can be exchanged by the call setting message in the ISDN. Since, in the present invention, a command can be transmitted/received using information of maintenance operation added to user-user information of the call setting message, the apparatus can be maintained by connecting it to a remote maintenance terminal, without using a private line.

A private electronic exchange apparatus according to the present invention will now be described in detail.

Figure 2:
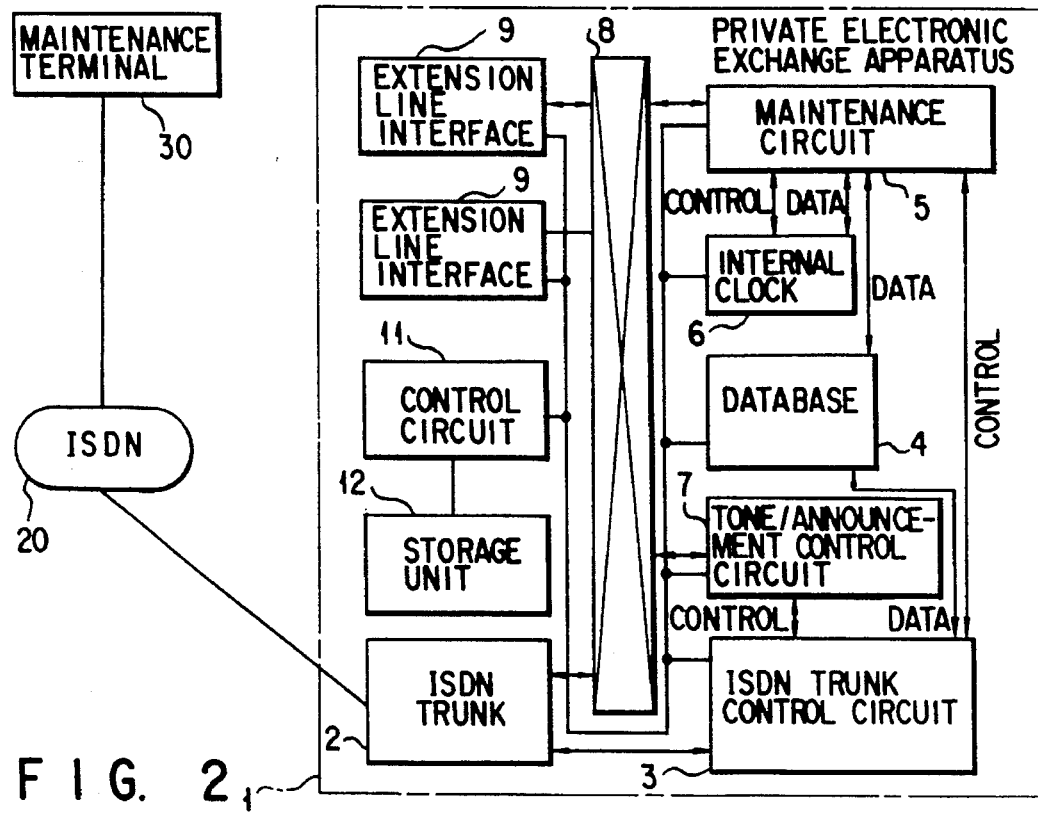
FIG. 2 is a block diagram of an electronic exchange apparatus according to a first embodiment of the present invention.

FIG. 2 is a block diagram showing an electronic exchange system including the private electronic exchange apparatus according to a first embodiment of the present invention.

The private electronic exchange apparatus 1 to be maintained, includes an ISDN trunk 2 interfacing with an ISDN 20, and the ISDN trunk 2 is controlled by an ISDN trunk control circuit 3. The apparatus 1 also includes a database 4 for keeping registered data, a maintenance circuit 5 for maintaining the apparatus 1, an internal clock 6, and a tone/announcement control circuit 7.

The database 4 registers in advance various data items so that they can be retrieved. These data items contain arbitrary subscribers' numbers of a maintenance loop and subscribers' numbers connected to a maintenance terminal 30 of a maintenance control center, which are some of subscriber's numbers (telephone numbers) of an ISDN subscriber loop housed in the apparatus 1, type information of maintenance commands, etc. (The data base may register sub-addresses of the maintenance terminal 30 which are used as calling party numbers for maintenance, when the need arises.)

The ISDN trunk 2 is connected to the ISDN subscriber loop and interfaced with the ISDN 20. The ISDN trunk 2 transmits/receives D-channel data and B-channel data or acquires the ISDN subscriber loop. More specifically, the ISDN trunk 2 transmits/receives D-channel data between the ISDN trunk control circuit 3 and the ISDN subscriber loop, and transmits/receives B-channel data between the ISDN loop and channel switch 8.

The ISDN trunk control circuit 3 receives D-channel data to detect whether a called party number coincides with a subscriber's number of the maintenance loop registered in the database 4. If they coincide with each other, the circuit 3 checks whether a calling party number (a subscriber's number of a caller side) is registered in the database 4 (including the sub-addresses of the maintenance terminal 30, if necessary). If the calling party number is registered therein, the circuit 3 determines that the D-channel data is a call to the maintenance loop and performs a maintenance operation. If the calling party number is not registered, it determines that the D-channel data is a normal signal received and thus processes this signal.

The ISDN trunk control circuit 3 removes various commands and data from the user-user information areas of the call setting message and the other messages transmitted from the maintenance terminal to control the maintenance circuit 5, database 4, tone/announcement control circuit 7, etc., then send a result of the control to the ISDN trunk 2 through the D-channel, and return it to the maintenance terminal.

The maintenance circuit 5 is connected to its counterpart (maintenance) terminal 30 via the ISDN 20 in response to a connection command supplied from the ISDN trunk control circuit 3 in order to transfer information between the circuit 5 and the terminal 20. If the information is a command, the maintenance circuit 5 is able to execute the command to alter, set, and read the data of database 4, internal clock 6, and tone/announcement control circuit 7. The maintenance circuit 5 is also able to alter, set, and read the data of database 4, internal clock 6, and tone/announcement control circuit 7 in response to a command supplied from the maintenance terminal 30 directly connected to the private electronic exchange apparatus 1. That is, the maintenance circuit 5 has a function of returning a response necessary for executing the commands to the ISDN trunk control circuit 3.

The internal clock 6 generates necessary time information and date information in the exchange apparatus 1, and is to able to change the information under the control of the maintenance circuit 5.

The tone/announcement control circuit 7 stores information representing the type of tone for each tone/announcement number, and supplies a signal of the tone to the channel switch 8 in response to an instruction given from a control circuit 11.

An extension line interface 9 is interposed between the channel switch 8 and the terminal of an extension telephone set or the like to interface them with each other. The control circuit 11 is a control center of the apparatus 1. A memory 12 stores a control program and the like for the control circuit 11.

In order to maintain the exchange apparatus 1, the maintenance terminal 30 is connected to the apparatus 1 via the ISDN 20.

Figure 4:
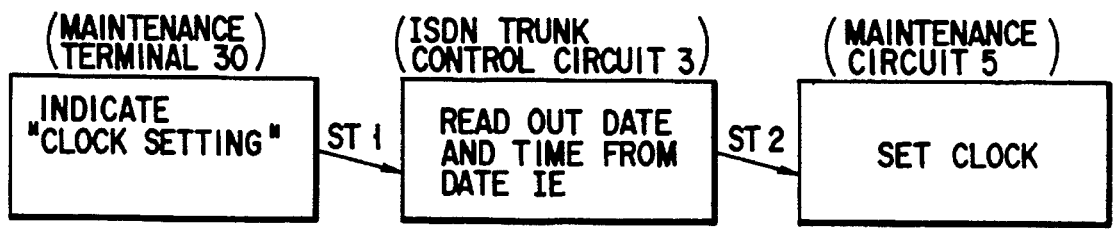
FIG. 4 is a view showing an operation sequence for explaining an example of remote-control maintenance of the apparatus shown in FIG. 2.
Figure 5:
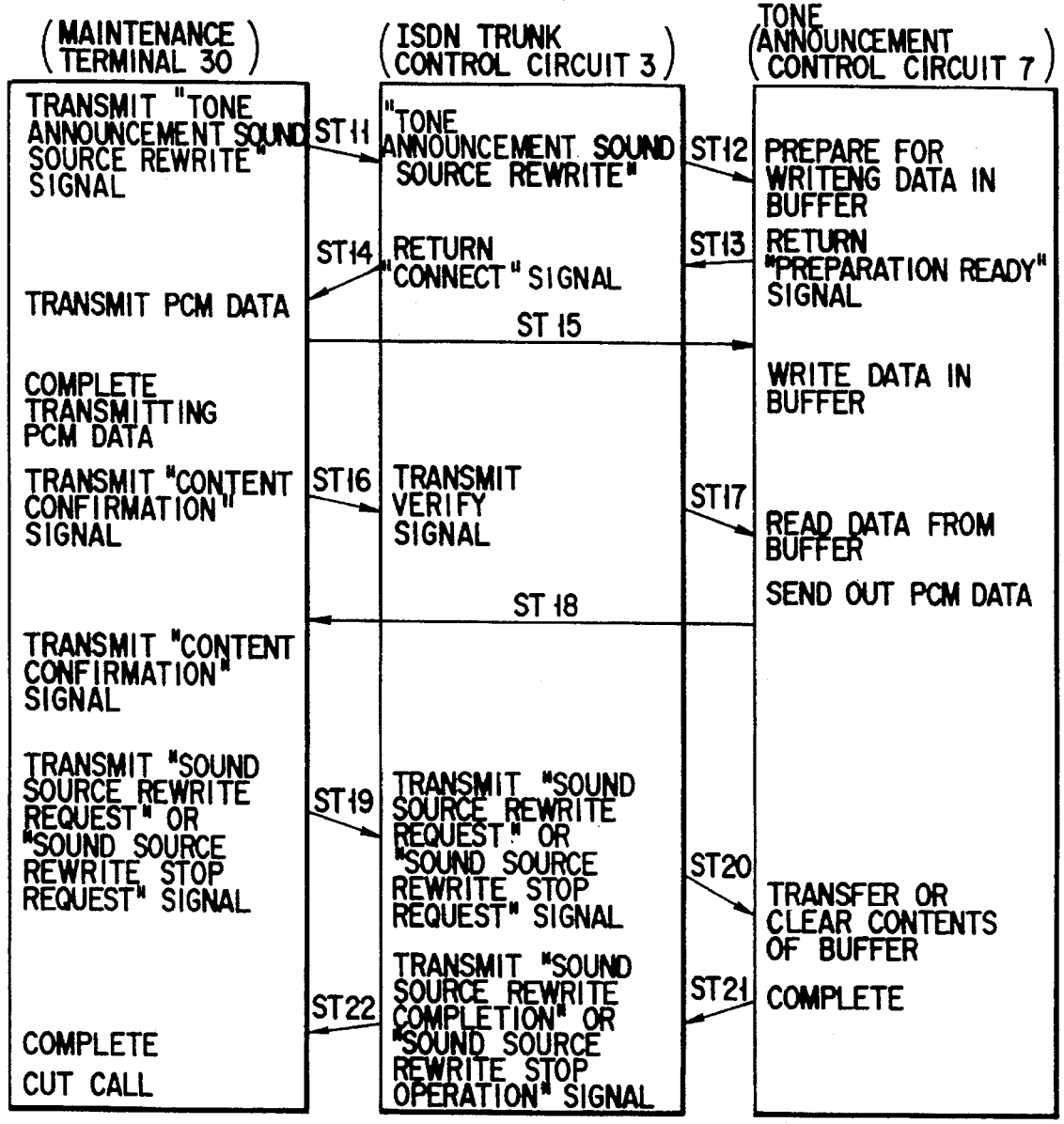
FIG. 5 is a view showing an operation sequence for explaining an example of the remote-control maintenance.
Figure 6:
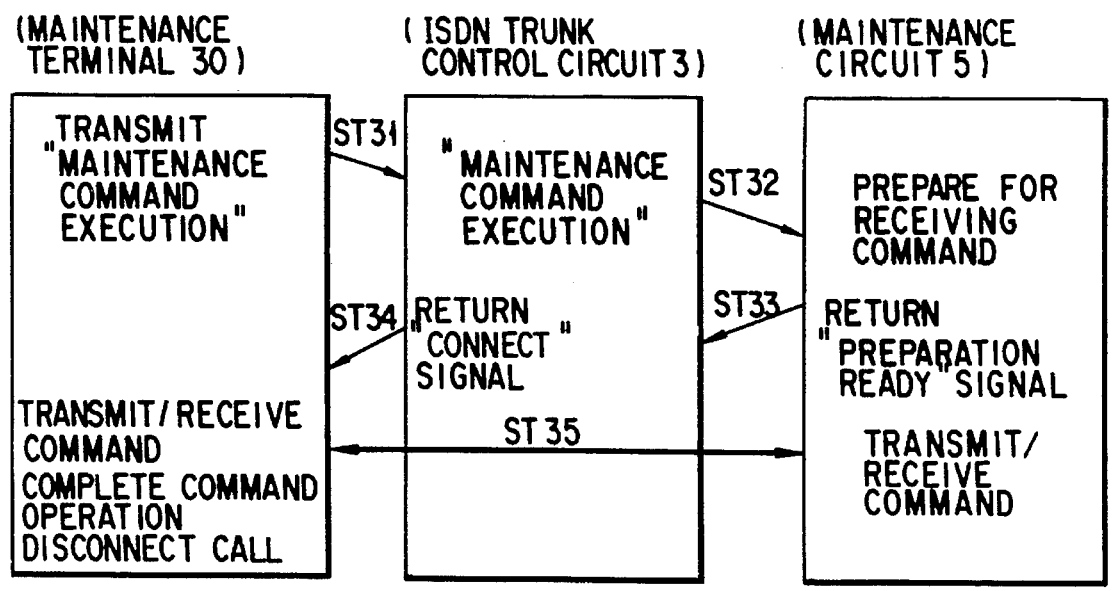
FIG. 6 is a view showing an operation sequence for explaining an example of the remote-control maintenance.

FIG. 3 is a flowchart showing an operation for the remote-control maintenance of the private electronic exchange apparatus according to the present invention. Examples of the remote-control maintenance are shown in FIGS. 4 to 6 as operation sequences.

In the electronic exchange system of the present invention, a maintenance telephone number is registered in the database 4 of the apparatus 1 as a virtual received-signal destination. The maintenance telephone number is selected properly from among the subscribers' numbers registered in the ISDN as destinations of signals received through the ISDN loop.

To maintain the exchange apparatus 1, a maintenance number of the apparatus 1 that an operator wants to access, is dialed from the maintenance terminal 30 (step S1). In this step, a subscriber's number is supplied from the maintenance terminal 30 to the ISDN 20 as a calling party number.

The information of the calling party number is sent in the form of a setup message to the exchange apparatus 1 via the ISDN 20 through the D-channel of the ISDN (step S2). The setup message is received by the ISDN trunk 2 and then transmitted to the ISDN trunk control circuit 3 (step S3).

The ISDN trunk control circuit 3 reads out a "called party number" from the call setting message and checks whether the called party number coincides with the maintenance number of the apparatus 1 registered in the database 4 (steps S4 and S5). In step S5, when these numbers do not coincide, the ISDN trunk control circuit 3 processes the called party number as a normal received-signal (step S9).

In step S5, when they coincide with each other, the ISDN trunk control circuit 3 reads a "calling party number" out of the call setting message (step S6). The circuit 3 retrieves the database 4 to check whether the calling party number of the call setting message coincides with one of the calling party numbers of the maintenance terminal registered in the database 4 (the subscribers' numbers of the loop connected to the maintenance terminal) (step S7).

In step S7, when there is no coincidence between them or the calling party number is not informed, the reception of a signal is refused (step S10). When there is coincidence, the ISDN trunk control circuit 3 determines the call as a maintenance call and returns a signal indicative of "reception of call setting" to the ISDN 20 (step S8).

As examples of the remote-control operation, the maintenance operations of setting the internal clock and rewriting the tone/announcement will now be described. The following examples show the maintenance operations performed after step S8 in FIG. 3.

(1) SETTING THE INTERNAL CLOCK

The maintenance operation of setting the internal clock 6 in response to a command from the maintenance terminal 30, will now be described, with reference to FIG. 4.

A keyboard of the maintenance terminal 30 is operated to send out a clock-setting command. If the call setting message includes a user-user information area, the clock-setting command is stored in this area. If a subscriber's number is called by dialing the maintenance number of the exchange apparatus 1, the clock-setting command can be transmitted to the subscriber loop of the subscriber's number through the ISDN, together with date/time information and calling party number information, by the call setting message (step ST1). The exchange apparatus 1 having the subscriber loop receives the clock-setting command via the ISDN trunk 2. The ISDN trunk control circuit 3 detects from a command code stored in the user-user information area what maintenance the command indicates.

If the ISDN is able to transmit user-user information in the form of a call setting message, the ISDN trunk control circuit 3 detects whether a received signal is a maintenance call or a normal received-signal call on the basis of the call setting message. When the circuit 3 detects that the received signal is a maintenance call, it detects from the command code what maintenance the maintenance call indicates, reads date/time information from a date/time information area of the received message, and then supplies a clock-setting signal to the maintenance circuit 5.

As described above, the ISDN trunk control circuit 3 detects from a command code stored in the user-user information area what maintenance a received signal represents, reads date/time information from the date/time information area of a received message, and supplies a clock-setting signal to the maintenance circuit 5 (step ST12). Receiving this signal, the maintenance circuit 5 sets the internal clock 6 in accordance with the date/time information (step ST3).

(2) REWRITING THE TONE/ANNOUNCEMENT

The maintenance operation of rewriting the contents of a tone/announcement sound source (PCM) in the private electronic exchange apparatus 1 in response to a command from the maintenance terminal 30, will now be described, with reference to FIG. 5. For example, there are directory assistance, hold-on melody, and attendant for an absentee, as the tone/announcement sound source.

The keyboard of the maintenance terminal 30 is operated to send out a "tone/announcement sound source rewrite" command. If the call setting message includes a user-user information area, the "tone/announcement sound source rewrite" command is stored in this area when a subscriber's number is called by dialing the maintenance number of the exchange apparatus 1. The "tone/announcement sound source rewrite" command can be transmitted to the subscriber loop of the subscriber's number through the ISDN, together with "date/time information" and calling party number information, by the call setting message.

More specifically, a maintenance call for rewriting a tone/announcement sound source is supplied from the maintenance terminal to the ISDN 20 by the call setting message (step ST11). The maintenance call is added to the user-user information area of the message as data and then transmitted from the ISDN 20 to the ISDN trunk 2 of the exchange apparatus 1. Information of "information bearer capability class" contained in the message designates "nonrestrictive digital."

When the ISDN trunk 2 receives the calling set message, the ISDN trunk control circuit 3 inspects the content of the data added to the received call setting message (step ST12). If the circuit 3 detects the "tone/announcement sound source rewrite" information from the received message, it connects the tone/announcement control circuit 7 with the information channel (B-channel) of the ISDN loop and instructs the circuit 7 to receive PCM data. When the tone/announcement control circuit 7 is ready to receive it, it informs the ISDN trunk control circuit 3 of the ready (step ST13). Upon receiving a signal indicative of the "ready", the ISDN trunk control circuit 3 returns the signal to the maintenance terminal 30 through the ISDN 20 (step ST14).

When the maintenance terminal 30 receives the signal indicative of the "ready", it sends new PCM data to the information channel of the ISDN (step ST15).

The PCM data sent to the information channel is transmitted to the tone/announcement control circuit 7 through the ISDN trunk 2 and the channel switch 8, and the tone/announcement control circuit 7 stores the PCM data in its internal buffer (step ST15).

After the maintenance terminal 30 sends the PCM data, it transmits a signal representing "verify" to the ISDN trunk control circuit 3 (step ST16). This signal is supplied to the ISDN trunk 2 via the ISDN 20 and then to the ISDN trunk control circuit 3.

The ISDN trunk control circuit 3 supplies the received signal of "content confirmation" to the tone/announcement control circuit 7 (step ST17). The tone/announcement control circuit 7 reads out the PCM data from the internal buffer in response to the signal and transmits it to the information channel of the ISDN (step ST18). This PCM data is supplied to the maintenance terminal 30 through the channel switch 8 and the ISDN trunk 2.

In order to confirm the content of the PCM data, the maintenance terminal 30 compares the PCM data received from the exchange apparatus 1 with the data output from the terminal 30 and displays a result of this comparison. Otherwise, the maintenance terminal 30 converts the PCM data into its corresponding tone/announcement voice to let a maintenance man hear it. The maintenance man, who has confirmed that the PCM data has been transmitted correctly, operates the maintenance terminal 30 and sends a "sound source rewrite request" (step ST19). If the maintenance man wishes to stop rewriting the sound source because of incorrect transmission of data, he operates the maintenance terminal 30 and sends a sound source rewrite stop request to the control channel (D-channel) of the ISDN (step ST19).

The above request signals are transmitted to the ISDN trunk 2 via the ISDN 20, and the ISDN trunk control circuit 3 receives the control channel data via the ISDN trunk 2. The ISDN trunk control circuit 3 then supplies the signal of sound source rewrite request or sound source rewrite stop request to the tone/announcement control circuit 7 (step ST20).

When the tone/announcement control circuit 7 receives the signal of "sound source rewrite request", it transfers the signal to a PCM sound source having a number designating the content of the internal buffer. After that, a signal representing "sound source rewrite completion" is supplied to the ISDN trunk control circuit 3. When the tone/announcement control circuit 7 receives the signal representing the "sound source rewrite stop request", it clears the internal buffer and transmits a signal representing "sound source rewrite stop completion" to the ISDN trunk control circuit 3 (step ST21).

The ISDN trunk control circuit 3 transmits the signal of "sound source rewrite completion" or "sound source rewrite stop completion" to the ISDN 20 (step ST22).

Upon receiving the signals of "sound source rewrite completion" or "sound source rewrite stop completion", the maintenance terminal 30 completes its maintenance operation and cuts a call.

(3) EXECUTION OF MAINTENANCE COMMAND

Referring to FIG. 6, the execution of a maintenance command will now be described. FIG. 6 shows the execution of a maintenance command when a maintenance call is made.

The maintenance terminal 30 sends a signal indicating "maintenance command execution" (step ST31). The "maintenance command execution" signal is added to the "user-user information" area of the message and then transmitted to the ISDN trunk 2 of the apparatus 1 through the ISDN 20. The information of "maintenance command execution" is supplied to the ISDN trunk control circuit 3.

The ISDN trunk control circuit 3 detects this information and prepares for connection of the maintenance circuit 5 and the information channel of the ISDN loop (step ST32). Then, the maintenance circuit 5 is ready to receive the command from the ISDN trunk control circuit 3, and transmits a signal indicative of "connection completion" to the ISDN trunk control circuit 3 (step ST33). After they are connected to each other, the ISDN truck control circuit 3 sets the "connection completion" in the "user-user information" area of the message and returns it to the ISDN 20 (step ST34).

After that, a command is transferred between the maintenance circuit 5 and the maintenance terminal 30 in accordance with information supplied through the information channel. The maintenance circuit 5 performs an operation corresponding to the command transmitted from the maintenance terminal 30 (step ST35). When the operation is finished, the maintenance terminal disconnects a call.

If the above operations are operated, the maintenance man can maintain a target private electronic exchange apparatus by remote control, and can perform a maintenance operation from a maintenance terminal, without forming a private loop between the exchange apparatus and the maintenance terminal.

Figure 7:
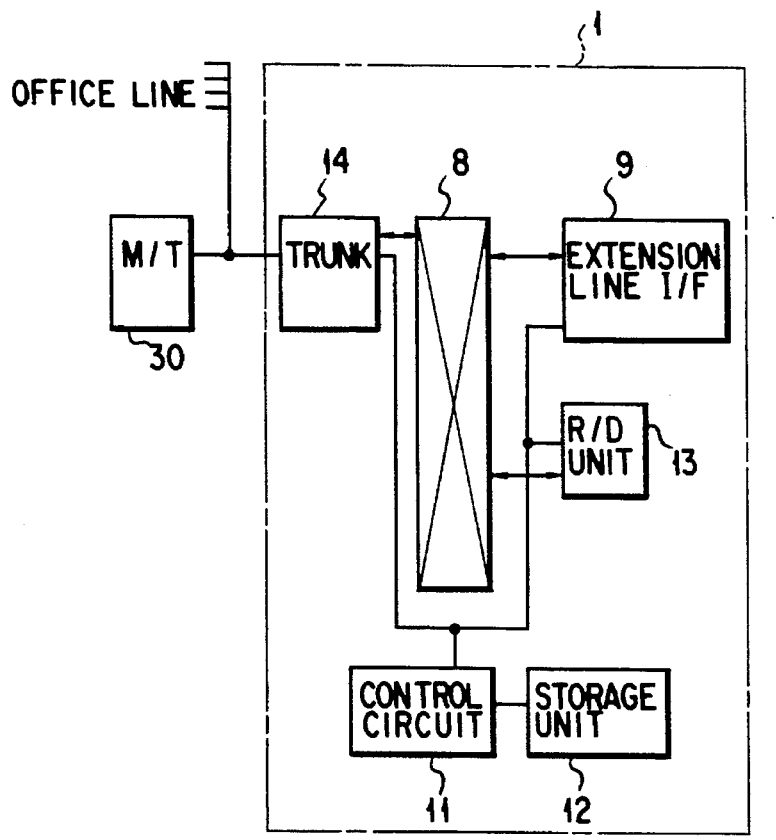
FIG. 7 is a block diagram of an electronic exchange apparatus according to a second embodiment of the present invention.

A private electronic exchange apparatus according to a second embodiment of the present invention will now be described, with reference to FIG. 7. In FIG. 7, the same elements as those in FIG. 2 are denoted by the same reference numerals, and their descriptions are omitted.

FIG. 7 is a block diagram of the exchange apparatus 1 which is to be maintained using a normal analog loop. In the second embodiment, the apparatus 1 comprises a channel switch 8, a control circuit 11, an extension line interface 9, a plurality of recording/reproducing devices 13, a trunk 14, and a receiver 15.

The recording/reproducing devices 13 record various messages and vary in type from message to message. In this embodiment, the recording/reproducing devices 13 are used selectively by remote control.

In the second embodiment, an instruction for maintenance given by remote control is transmitted via a trunk 14 and a receiver 15 on the normal telephone line. To maintain the apparatus 1, a special number for the maintenance is called directly from a maintenance terminal 30 and then a calling party number of the maintenance terminal 30 is sent to the control circuit 11 as in the first embodiment. The control circuit 11 refers to the calling party number and determines whether the maintenance instruction is issued from the normal maintenance terminal. If yes, a maintenance mode is set. If no, the control circuit 11 prevents the apparatus 1 from being set in a maintenance mode and informs the maintenance terminal 30 of this.

After the apparatus enters the maintenance mode, the control circuit switches a first one of recording/reproducing devices 13, which is used before the maintenance, to a second one of them in response to the instruction issued from the maintenance terminal 30.

Specifically, each the recording/reproducing devices 13 has a following message.

A first recording/reproducing device 13, for example, responds a following message, when the truck 14 receives a received signal in a day time.

"Hello, this is xx company. Please input a phone number, general division is No. 100, commerce division is No. 200 . . ."

When a predetermined appropriate extension number is received, a call is performed to an extension telephone allocated to a division corresponding to the extension number, and the call is received in response to a response of the extension telephone.

On the other hand, a second recording/reproducing device 13, for example, stores a response message using at night. In this case, the following message is stored.

"Hello, this is xx company. If necessary, input No. 500."

The devices described above are switched in response to the maintenance command.

In the second embodiment, the apparatus switches the recording/reproducing device storing a response message using at day time and the recording/reproducing device storing a response message using at night by remote control, the apparatus may switch the recording/reproducing device storing an ordinary response message and the recording/reproducing device storing an urgent response message.

In the second embodiment, the apparatus is set in the maintenance mode by directly calling a special. However, it can be set by inputting an extension number for maintenance through a telephone exchange apparatus.

In addition, this embodiment shows an embodiment which performs a remote maintenance after the apparatus is set to a maintenance mode, a remote maintenance may be performed by simultaneously transferring the extension call for maintenance and maintenance command.

As described above, the electronic exchange apparatus according to the present invention is maintained by remote control based on information supplied from a maintenance terminal through a communications network. This apparatus comprises memory means for storing called party number information representing a number for maintaining the electronic exchange apparatus and calling party number information representing a number of the maintenance terminal for allowing a maintenance operation, and control means for, when a call is received from the communications network, detecting whether called party number information and calling party number information included in a message transmitted together with the call, coincide with the called party number information and the calling party number information stored in the memory means, respectively, and for, when the information included in the message coincides with the information stored in the memory means, recognizing the call as a maintenance call for maintaining the electronic exchange apparatus, thereby setting the electronic exchange apparatus in a maintenance mode.

In the electronic exchange apparatus, the message includes maintenance operation information, and the control means comprises means for maintaining the electronic exchange apparatus based on the maintenance operation information included in the message.

In the electronic exchange apparatus having the above constitution, the memory means stores the called party number information representing a number for maintaining the apparatus itself and the calling party number information representing a number for allowing a maintenance operation. When the apparatus needs to be maintained, a called party number for maintaining the apparatus, to which an information element for a desired maintenance operation is added, is called from an external communication terminal (maintenance terminal). If a digital network is used in this case, the called party number, the information element, and a calling party number (a telephone number of a subscriber's loop connected to the communication terminal) are added to a call setting message of communication protocol, and this message is transmitted to a destination. In the exchange apparatus, the control means compares the called party number and the calling party number added to the call setting message with the information stored in the memory means in order to detect whether the called and calling party numbers are set for allowing the maintenance operation. If these numbers are set therefor, the exchange apparatus moves to a maintenance mode, and a user's desired information element is acquired from the transmitted message. This information element serves as information of the maintenance operation.

With the above operation, the exchange apparatus can be maintained based on the information transmitted from the communication (maintenance) terminal connected to an office line of the apparatus. After the apparatus moves to the maintenance mode, the control means is able to directly perform various maintenance operations other than the maintenance operation instructed by the message transmitted from the communication (maintenance).

As described above, in the present invention, the exchange apparatus stores in advance a called party number used for its maintenance and a calling party number given to the maintenance terminal and, when a called party number and a calling party number of a received-signal call coincide with those stored in advance, respectively, determines the received-signal call as a maintenance call and employs maintenance information or inn-channel information transmitted by the call for the maintenance of the apparatus.

Consequently, according to the present invention, the maintenance of the exchange apparatus can be performed by remote control without using any private line, and it can also be performed using calling-number and called-number information transmitted only from the maintenance terminal connected to a specific office line of the apparatus. The lines of the apparatus can thus be used with high efficiency.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic exchange apparatus which is maintained by remote control based on information supplied from a maintenance terminal through a communications network, comprising:

memory means for storing called party number information representing a number for maintaining the electronic exchange apparatus and calling party number information representing a number of the maintenance terminal for allowing a maintenance operation;

control means for, when a call is received from the communications network, detecting whether called party number information and calling party number information included in a message transmitted together with the call, coincide with the called party number information and the calling party number information stored in the memory means, respectively, and for, when the information included in the message coincides with the information stored in the memory means, recognizing the call as a maintenance call for maintaining the electronic exchange apparatus, thereby setting the electronic exchange apparatus in maintenance mode; and a plurality of recording/reproducing devices for respectively recording and reproducing various messages in order to automatically respond to calls.

2. The apparatus according to claim 1, wherein said communications network is a digital communications network.

3. The apparatus according to claim 2, wherein said message including the calling party number information and the called party number information is added to a message of communication protocol.

4. The apparatus according to claim 1, wherein said message includes maintenance operation information, and said control means comprises means for maintaining the electronic exchange apparatus based on the maintenance operation information included in the message.

5. The apparatus according to claim 1, wherein said memory means further stores information for instructing the maintenance operation.

6. The apparatus according to claim 1, wherein said memory means stores at least one of a clock-setting command and a tone/announcement rewriting command.

7. The apparatus according to claim 4, further comprising:

a channel switch for switching connection of a plurality of devices included in the electronic exchange apparatus, and wherein said control means comprises means for turning on the channel switch in such a manner that a desired one of said recording/reproducing devices is connected to the communications network, based on the maintenance operation information from the communications network.

* * * * *

UNITED STATES PATENT AND TRADEMARK OFFICE
CERTIFICATE OF CORRECTION

PATENT NO. : 5,461,662
DATED : October 24, 1995
INVENTOR(S) : Katsuyuki HANAI

It is certified that error appears in the above-indentified patent and that said Letters Patent is hereby corrected as shown below:

Claim 1, Column 12, Line 24, before "maintenance" insert --a--.

Signed and Sealed this

Twenty-ninth Day of October 1996

Attest:

BRUCE LEHMAN

Attesting Officer    Commissioner of Patents and Trademarks